United States Patent [19]
Ando et al.

[11] Patent Number: 4,975,978
[45] Date of Patent: Dec. 4, 1990

[54] IMAGE SIGNAL AMPLIFIER

[75] Inventors: Mitsuhiro Ando, Taitou; Yoshihiro Naruse, Chiba, both of Japan

[73] Assignee: Aisin Seiki Kabushiki Kaisha, Aichi, Japan

[21] Appl. No.: 324,072

[22] Filed: Mar. 16, 1989

[30] Foreign Application Priority Data

Mar. 16, 1988 [JP] Japan .............................. 63-062936

[51] Int. Cl.⁵ .............................................. G06K 9/00
[52] U.S. Cl. .......................................... 382/50; 382/2; 340/825.06
[58] Field of Search ......................... 382/2, 50, 54, 56; 340/825.06

[56] References Cited

U.S. PATENT DOCUMENTS

| | | | |
|---|---|---|---|
| 4,201,977 | 5/1980 | Shimizu | 382/54 |
| 4,566,125 | 1/1986 | Clunn | 382/50 |
| 4,712,103 | 12/1987 | Gotanda | 382/2 |
| 4,754,487 | 6/1988 | Newmuis | 382/2 |

Primary Examiner—Leo H. Boudreau
Attorney, Agent, or Firm—Sughrue, Mion, Zinn, Macpeak & Seas

[57] ABSTRACT

In a real time image recognition circuit, an image signal amplifier recognizes mouth or eye movement by which different functions within an automobile, including operation of a radio, air conditioner, cruise control, door locks, sun roof, windows, wipers, lighter, headlights, and defroster may be controlled. Improved focusing on pertinent portions of a human head, such as eyes and mouth, lessens the need to compensate for contrast in ambient light conditions, and thus enhances recognizability.

6 Claims, 11 Drawing Sheets

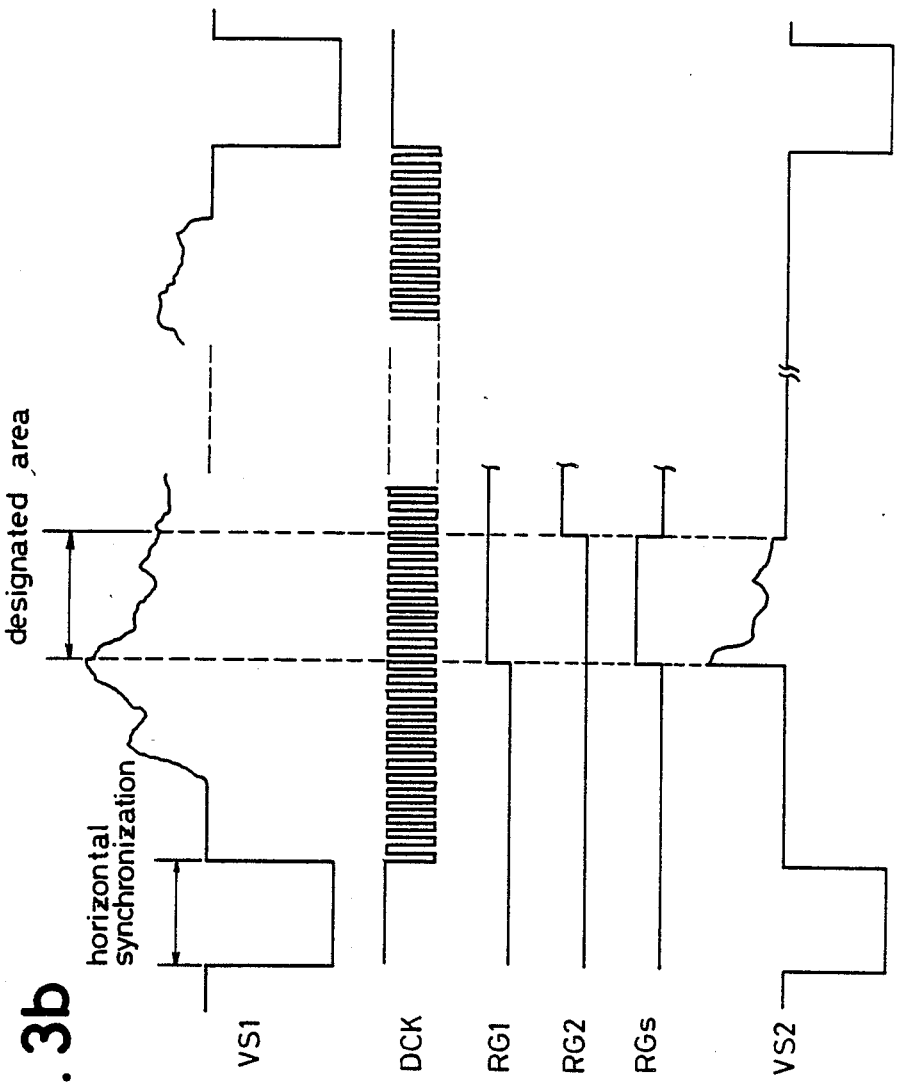

IMAGE SIGNAL AMPLIFIER

BACKGROUND OF THE INVENTION

The present invention relates to an image signal amplifier, especially used for pre-processing of an image signal in a real time image recognition circuit.

For example by taking a picture of someone's face by television camera and processing the image signal to recognize movement of the mouth or eyes, power on/-off or power up/down of a certain electric device can be controlled by optically recognizing such movement. Japanese Patent Application No. 60(1985)-272793 shows an example of this kind of device.

In this kind of optical control device, however, a device may not obtain image information necessary to recognize such movement when differences in image density are not sufficient. When a taken picture image is too dark or light, an automatic gain control (AGC) circuit is used to adjust an amplitude of the image signal to an appropriate density in order to recognize an image. Although a whole picture image may be light enough, a sampling area may be too dark or light. For example, in a bright background when people put on a hat and it makes a shadow on the eyes as shown in FIG. 6a, the eye part has less contrast than the contrast of a whole picture. When a light is applied to a subject from the side or at a slant, a part of the subject, for example hair, may make a shadow so that a contrast within the sampling area is lessened. In these situations, the AGC circuit may not adjust a signal level sufficiently to permit recognition.

When a microprocessor is used as an adjusting circuit, contrast can be adjusted by emphasizing a density of an image signal which is converted into a digital signal by the microprocessor. However, even digital processing has some problems, as mentioned below, when it is used for a real time image recognition circuit.

a) It is less effective if the differences in the density of the sampling area are not sufficiently bigger than an error of the quantization digital quantities.

b) It requires a high speed A/D converter with multi-bit operation and a large frame memory to minimize an error of the quantization digital quantities.

c) It takes a long time to process a recognizing operation of a microprocessor when there are many bits of image information.

When an amplitude of an image signal is adjusted as a full scale to the brightest part of an image signal, if a level of the brightest part is 100, an average density of a sampling area is 5, and the difference in density is 1, an error of the quantization of digital quantities has to be less than 1% in order to sample a preferred area. In this example, a preferred sample area has a 20% contrast; however, the difference in density is 1% of the full scale. Therefore, recognition is difficult.

When there is a wide dynamic range of image density, digital quantities have to be quantized by a large number of bits even if an image contains sufficient contrast This causes the above mentioned problems b) and c). Furthermore, when a part of an image information is emphasized by digital processing, data is required to show how much emphasis has to be done, so that this cannot be used for an automatic image recognition process.

SUMMARY OF THE INVENTION

Accordingly, one of the objects of the present invention is to produce an image signal amplifier which can amplify an image signal in order to recognize a comparatively dark or light part of an image picture even when a dynamic range of a whole image picture is very wide.

Another object of the present invention is to produce an image signal amplifier which is relatively simple and inexpensive, in addition to obviating the above drawbacks.

To achieve the above objects and in accordance with the principles of the invention as embodied and broadly described herein an image signal amplifier comprises: data storing means for storing a sampling area signal: area recognition means at least for identifying a scanning signal detected by a synchronized scan of an input image signal with the stored sampling area signal or for determining whether the scanning signal is greater than the stored sampling area signal; gain control means for controlling an amplifier gain of an input analog signal; and switching means for switching on and off the input analog signal which is applied to the gain control means in accordance with an output of the area recognition means.

In general an AGC circuit amplifies an input signal in accordance with an average level of an input analog signal. In accordance with the abovedescribed image signal amplifier, because a signal applied to the gain control means is only the sampling signal which is stored in the data storing means, a signal is amplified in accordance with an average level signal of the sampling signal.

As shown in FIG. 6a, because an eye part is in the shadow of a hat, the differences of the density between an eyeball and the skin area surrounding the eye are relatively small. The background is so bright that the differences in density of the eyeball and the skin area surround the eye are darker than the brightness of the whole picture. Then the present invention samples a small area covering only the right eye, as shown in FIG. 6d, and controls an amplifier gain in accordance with an average level of an image signal in the sampling area. Thus, an amplifier gain relating to the eyeball and the skin area around the eye can be sufficiently large because there is no influence from the brighter background. After emphasizing the differences in density in this way, it is easy to recognize the eye.

In accordance with the present invention, because the differences in density are emphasized by adjusting an amplitude of an analog signal, it is possible to emphasize the differences in the density even when the difference is very small within the sampling area. The present invention does not have a quantization error with respect to digital processing. The present invention can use an average level with a minimum or maximum level of the sampling area image signal as a reference level for gain control.

A mouth or an eye that is recognized by an image signal is not at the same position as the image signal. Therefore it is difficult to determine the exact position of the eye if the circuit wants to sample the eye position In accordance with the preferred embodiment of the present invention mentioned below, the present invention recognizes one part of an image signal and determines its position, then in accordance with the determined position the present invention determines the next sampling area and stores it in the data storing means. Further, the present invention changes the stored data in the data storing means and an amplitude of the gain control means if there is an error in the process.

BRIEF DESCRIPTION OF THE DRAWINGS

For a full understanding of the true scope of the invention the following detailed description should be read in conjunction with the drawings, wherein:

FIG. 3b is a timing chart showing an operation of the image signal processing circuit 200 in FIG. 1;

DETAILED DESCRIPTION OF THE PREFERRED EMBODIMENTS

In the following, preferred embodiments of the present invention will be described with reference to the drawings.

Figure 2:
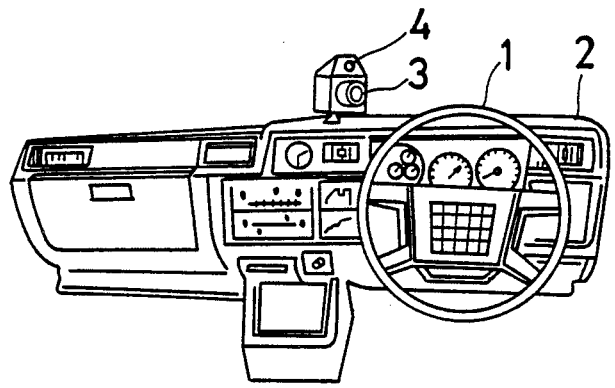
FIG. 2 is a view showing a console panel of a car on which one embodiment of the present invention is mounted.

FIG. 2 shows a console of an automobile, in which a television camera 3 is set on an instrument panel 2. The television camera 3 is adjustable to take a picture of a driver's face at an angle.

Figure 1:
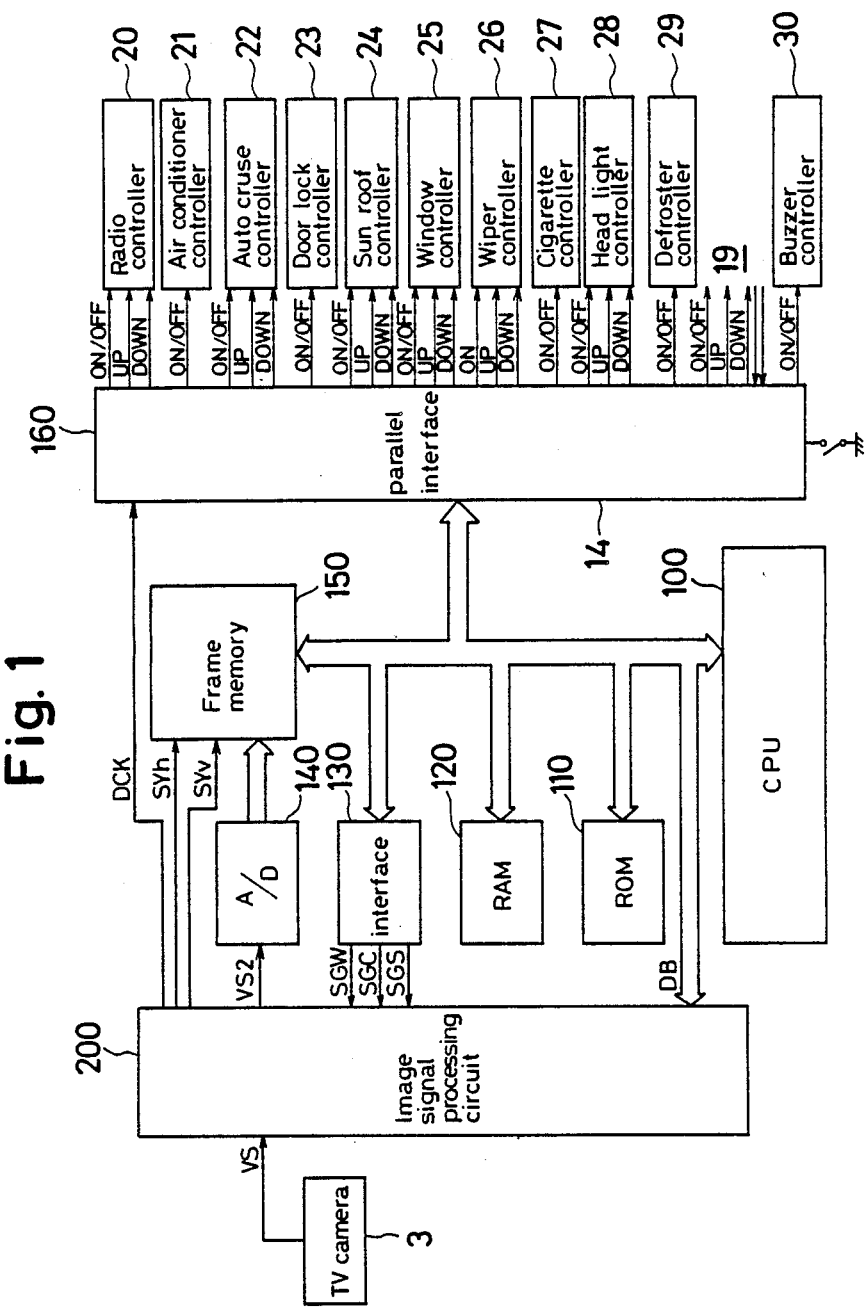
FIG. 1 is a block diagram showing one embodiment of the present invention.

FIG. 1 shows a block diagram of an optical image recognition system. This system controls several controllers mounted on an automobile by recognizing intentional eye movements of the driver. This system responds to eye movements; however, it also is possible to respond to intentional mouth movements, as shown in Japanese Patent Application No. 60(1985)-272793.

Figure 3A:
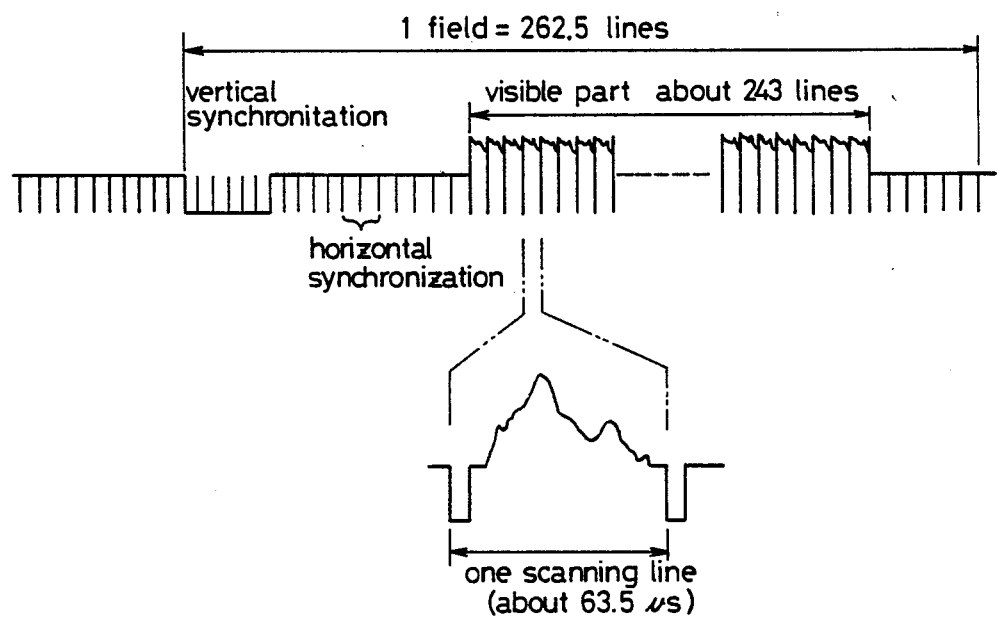
FIG. 3a is a wave signal of an image signal VS1 of the television camera 3 of the present invention.

Referring to FIG. 1, television camera 3 outputs a composite image signal VSI in accordance with NTSC standards. Television camera 3 scans a picture vertically and horizontally and outputs serial signals along with vertical and horizontal synchronization signals, as shown in FIG. 3a. There are 243 horizontal scanning lines in this system. An image signal VS1 is applied to an image signal processing circuit 200, which amplifies a part of the input image signal VSI and applies it to the A/D converter 140 as an analog image signal VS2. The A/D converter 140 converts the analog image signal VS2 into a 4-bit digital signal and sends the digital signal to a frame memory 150.

A microprocessor CPU 100 sends an image signal VS1 of the television camera 3 to the frame memory 150 through the image signal processing circuit 200 and A/D converter 140, operates a pattern recognition process in order to detect intentional eye movements, and controls the controllers in accordance with the detected eye movements. The image signal processing circuit 200 samples a part of the image signal VS1 as the analog image signal VS2 in response to CPU 100 settings. In this embodiment, a system bus of the CPU 100 is connected through a parallel interface circuit 160 to: radio controller 20, air conditioner controller 21, auto cruise controller 22, door locks controller 23 sun roof controller 24, window controller 25, wiper controller 26 cigarette lighter controller 27 head light controller 28 defroster controller 29, and buzzer controller 30.

Figure 4A:
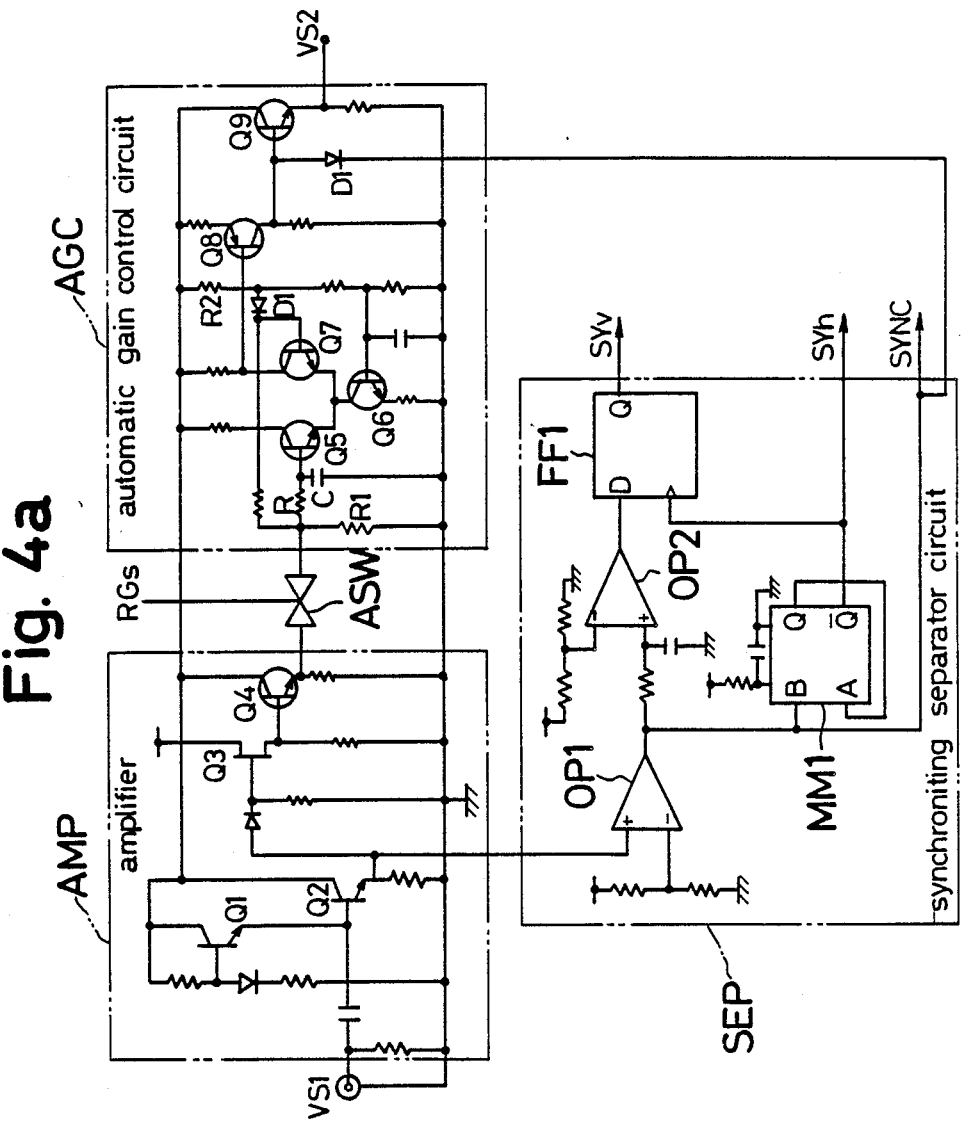
FIGS. 4a, 4b and 4c are circuit diagrams showing the image signal processing circuit 200 in FIG. 1.
Figure 4B:
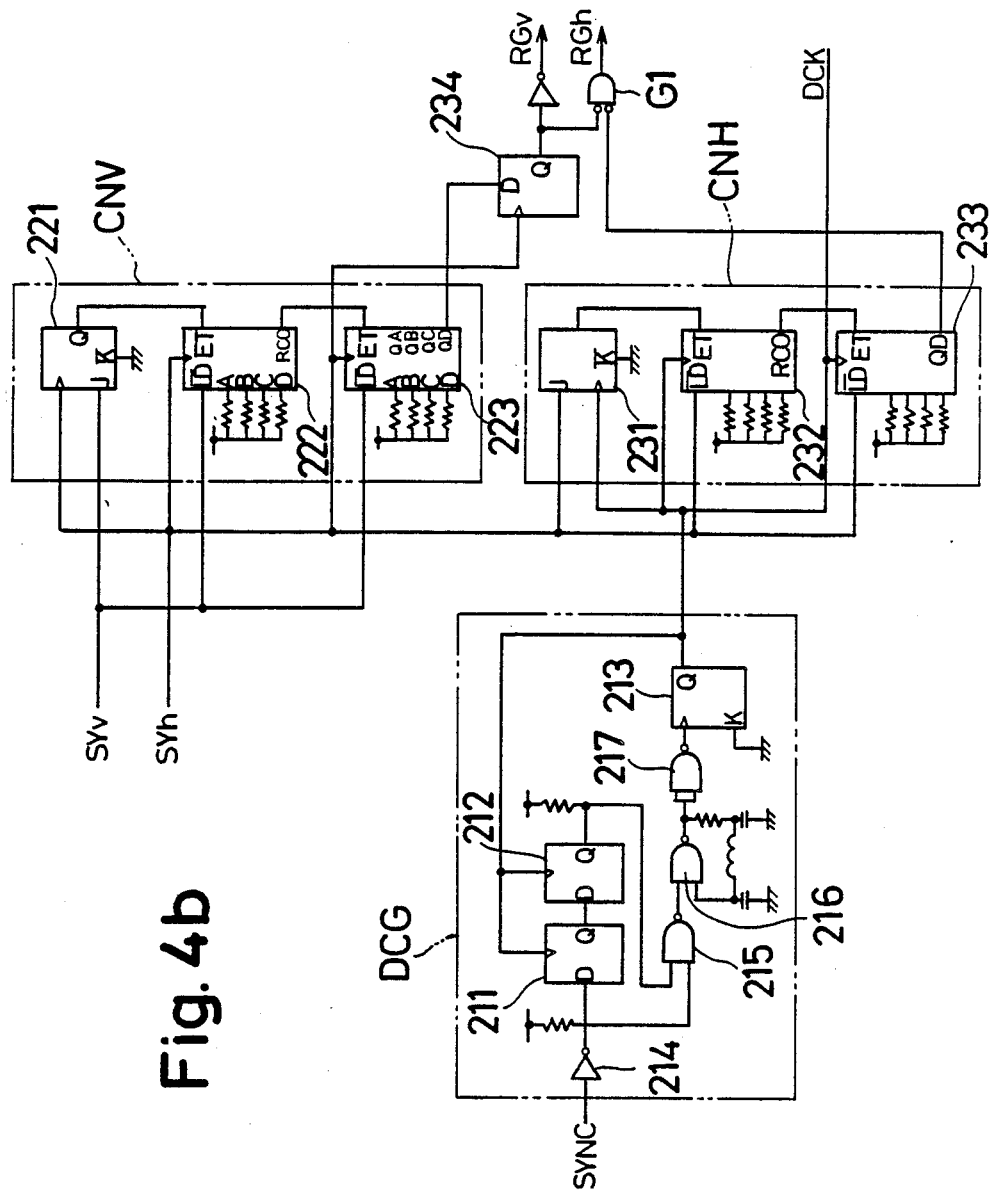
Figure 4C:
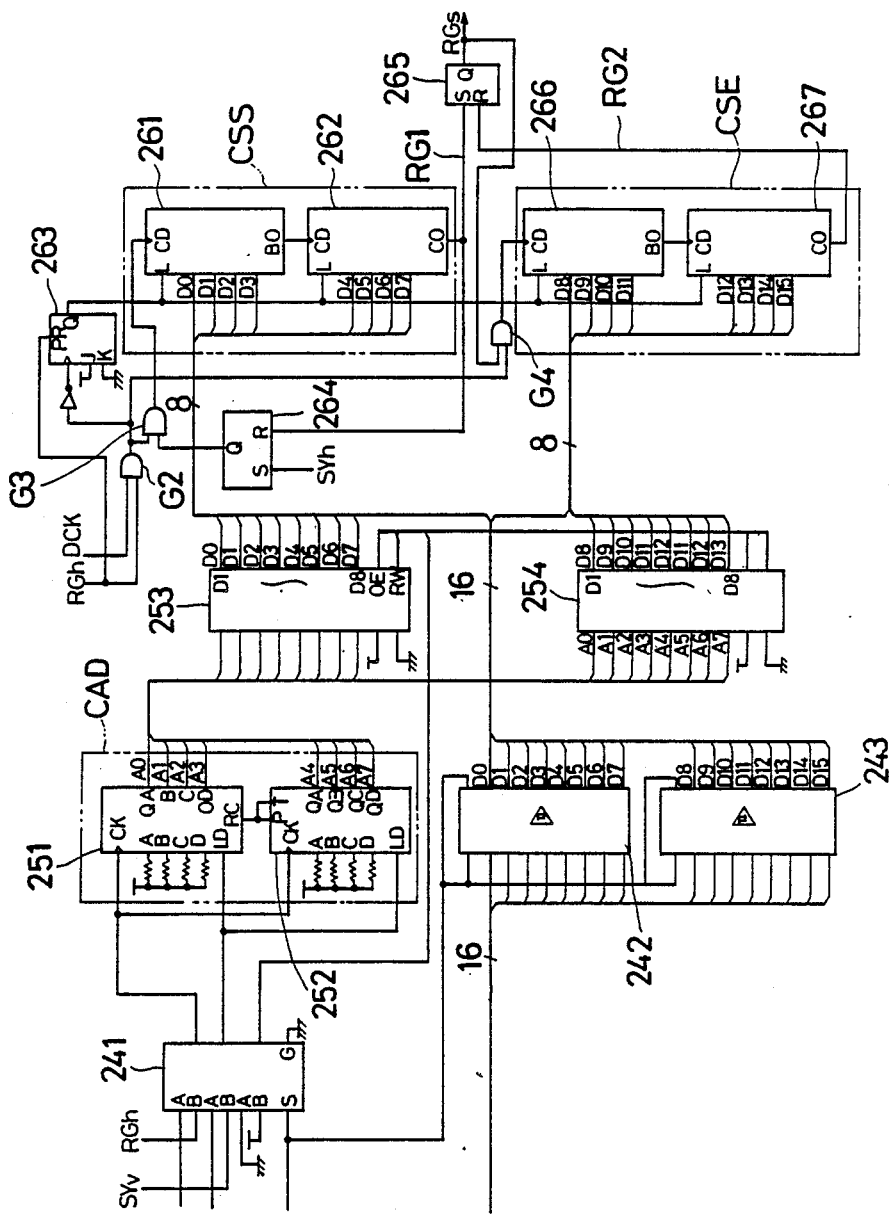

FIGS. 4a, 4b and 4c show circuit diagrams of the image signal processing circuit 200. Referring to FIG. 4a, an image signal VS1 is applied to an input terminal of the amplifier AMP. An amplified image signal VS1 is applied to the AGC circuit through an analog switch ASW. The AGC circuit comprises a differential amplifier which has a reverse input terminal and a non-reverse input terminal to which an image signal VS1 is applied. However one signal is applied to the terminal as an average level signal because of a time constant circuit comprising a resistor R and a condenser C. Therefore a gain of the AGC circuit becomes large when an average level of the image signal is small and becomes smaller when an average level of the image signal is large.

An output signal of a transistor Q2 in the amplifier circuit AMP is applied to an input terminal of a synchronizing separator circuit SEP. An operational amplifier OP1 converts the input analog signal into a binary signal in order to remove image signal content which is included in a composite image signal and to pick up the synchronization signals (vertical and horizontal) SYNC. An operational amplifier OP2 and connected elements distinguish only a long period of vertical synchronization signals in accordance with a frequency of the input signal.

A monostable multivibrator MMI distinguishes a short period of horizontal synchronization signal SYh from the synchronization signals SYNC. A flip-flop FF1 outputs a vertical synchronization signal SYv which is amended by the vertical synchronization signal SYh.

Referring to FIG. 4b, clock pulse generator DCG outputs a series of dot clock pulses DCK at a 6MHz frequency. These dot clock pulses DCK do not appear when the synchronization signal SYNC is at a low level. Counter circuits CNV and CNH distinguish between a period which shows effective vertical and horizontal image signals The counter CNV counts the horizontal synchronization signal SYh synchronizing with the vertical synchronization signal SYv, and outputs an area signal (RGv) which is effective during a period of 256 horizontal scanning lines and is not effective outside of the period. The counter CNH counts the dot clock DCK synchronizing with the vertical synchronization signal SYh and outputs an area signal (RGh) which is only effective during a 256-dot period.

Referring to FIG. 4c, circuits generate an area signal which distinguishes a sampling area from a non-sampling area. A counter circuit CSS distinguishes the beginning of a sampling area in each horizontal scanning line. A counter circuit CSE distinguishes the end of a sampling area in each horizontal scanning line. The counter circuits CSS and CSE comprise an 8 bit presettable counter and count a dot clock DCK when the area signal RGh is effective. Preset data is loaded to each respective counter circuit if the area signal RGh becomes effective. The counter circuit CSS outputs a high level signal "H" as the area signal RG1 when a present value is counted over. A flip-flop 265 is set and a flip-flop 264 is reset. Because an input of the dot clock is cut to the counter circuit CSS in accordance with a reset of the flip-flop 264, the counter circuit CSS keeps the state in order to keep the area signal RG1 at a high level "H".

When the flip-flop 265 is set by the area signal RG1 and the area signal RGs takes a high level "H", a dot clock is applied to the counter circuit CSE through a gate G4 so that the counter circuit CSE starts counting down the preset value. When the countdown is finished, the area signal RG2 takes a high level "H" and the flip-flop 265 is reset. Then the area signal RGs takes a low level "L" and a dot clock is cut off to the counter circuit CSE because the gate G4 is closed. Therefore in each horizontal scanning line positions where the area signal RGs changes from a low level "L" to a high level "H" and from a high level "H" to a low level "L" depend on preset values in the counter circuits CSS and CSE, respectively. For example, if the preset values are set to be 64 and 32 in the counters CSS and CSE, respectively, in a horizontal scanning line, the area signal RGs is a low level "L" between the left end and the 64/256 position, is a high level "H" between 65/256 and 96/256 and is a low level "L" between 97/256 and the right end.

In this embodiment, preset data of the counters CSS and CSE are input from random access memories RAM 253 and 254. RAM 253 and RAM 254 each has an 8-bit address area, and stores 256 8-bit pieces of data which are changed by CPU 100. The output of address counter CAD is applied to the 8-bit address terminals of RAMs 253 and 254. The address counter CAD comprises an 8-bit counter and counts the area signal RGh as a clock pulse except when the content of the RAM 253 or 254 is being changed by CPU 100. Because the address counter CAD sets count data as a preset value in synchronization with the vertical synchronization signal SYv, the count data is synchronized with the synchronized signal SYv. In the area signal RGh, one pulse appears in each horizontal scanning line so that the counter value of the counter CAD corresponds to a vertical scanning position. Therefore a read out address of RAMs 253 and 254 is changed in each horizontal scanning line. The preset data in the counter CSS and CSE is given from the address of RAM 253 and 254 respectively, in every horizontal line. Each piece of address data 0, 1, 2, . . . of RAM 253 and 254 corresponds to the data 1, 2, 3, . . . in the horizontal scanning line from the top of the scanning position CPU 100 changes the data of RAM 253 and 254.

When a select signal SGS is a high level "H" which is applied to the data selector 241, the data selector selects a group A of input signals, and when the select signal SGS is a low level "L", the data selector selects a group B of input signals. Because the clock signal and the load control signal of the address counter CAD which generate the address data of RAMs 253 and 254 are changed into the signals SGW and SGC controlled by CPU 100, the CPU 100 can designate the address data for RAMs 253 and 254. Low order 8-bit data of 16-bit data which goes through the 16-bit data bus of CPU 100 is applied to RAM 253 and is stored at the designated address, and high order 8-bit data is applied to RAM 254 and stored at the designated address.

Referring to FIG. 4a, an output image signal of the amplifier AMP is applied to the AGC circuit through an analog switch ASW. Accordingly, when the analog switch ASW is on, the image signal is a to the AGC circuit and when the analog switch ASW is off, the image signal is not applied. Thus, the image signal VS2 of the AGC circuit shows a part of the image signal VS1 during a period when the area signal RGs is at a high level "H" as shown in FIG. 3b.

Although the synchronization signal is cut off by the analog switch ASW, the image signal VS2 includes the synchronization signal because the synchronization signal is joined to the image signal through the diode D1 at the input side of the transistor Q9.

Figure 6A:
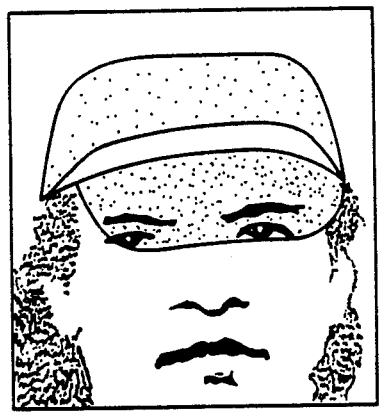
FIGS. 6a, 6b, 6c and 6d are views showing the relationships between the image signals and the windows.
Figure 6B:
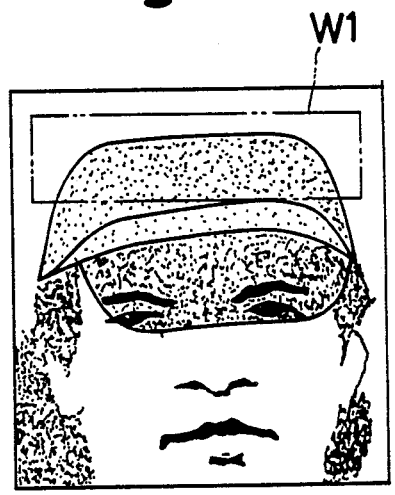
Figure 6C:
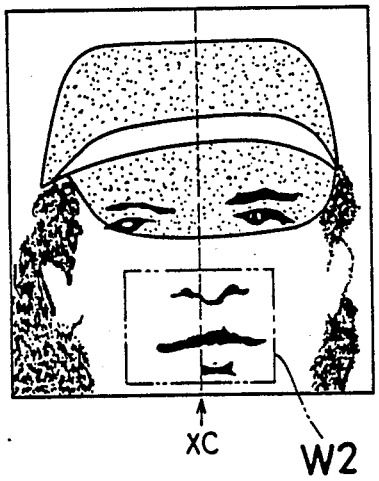
Figure 6D:
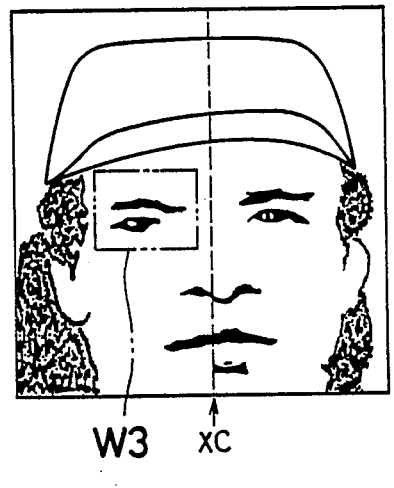

In the AGC circuit, the gain is determined in response to the average level of the input signal. Therefore, when a part of the image signal is selectively applied to the AGC circuit by controlling the analog switch a signal of the non-selected area does not affect the gain control of the AGC circuit. In other words, if the input image signal is same the gain of the AGC circuit can be changed by changing a selected area. For example, when an image shown in FIG. 6a is obtained by adjusting the gain in response to the average image level, images as shown in FIGS. 6b, 6c and 6d are obtained by selecting window areas W1, W2 and W3, respectively. It should be noted that the actual image signal VS2 does not have any image outside the windows in FIG. 6b, 6c and 6d. In FIG. 6a, the background, the face and the hat are relatively bright so that the eyeball is dark because of the shadow. Then, if a window W3 is set, as shown in FIG. 6d, and the signal inside the window W3 is selectively applied to the AGC circuit by the analog switch ASW. differences in density between the eyeball and the skin area are emphasized because the low average level of the output signal makes the gain high.

Figure 5A:
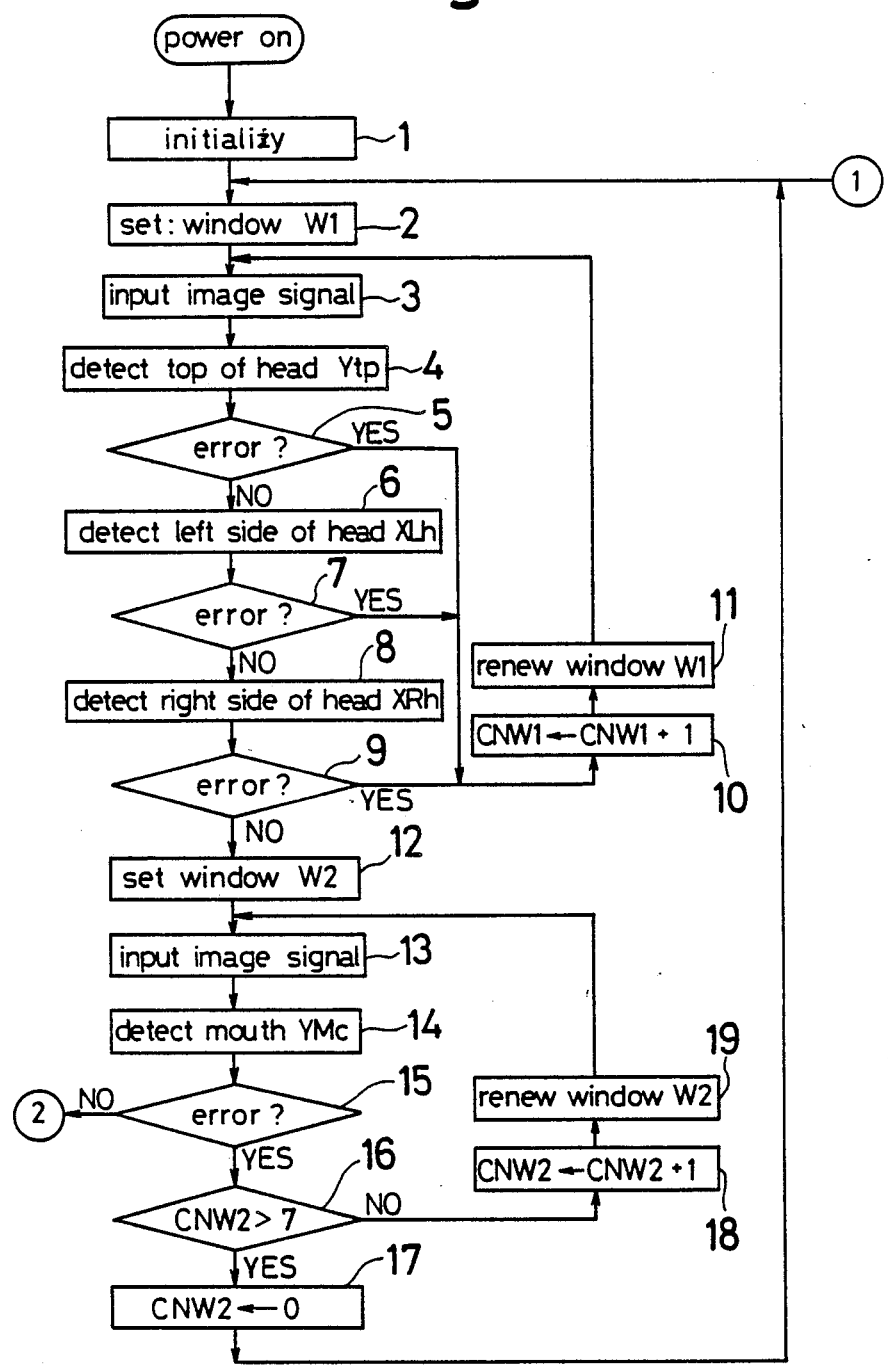
FIGS. 5a and 5b are flow charts showing an operation of the microprocessor 100 in FIG. 1.
Figure 5B:
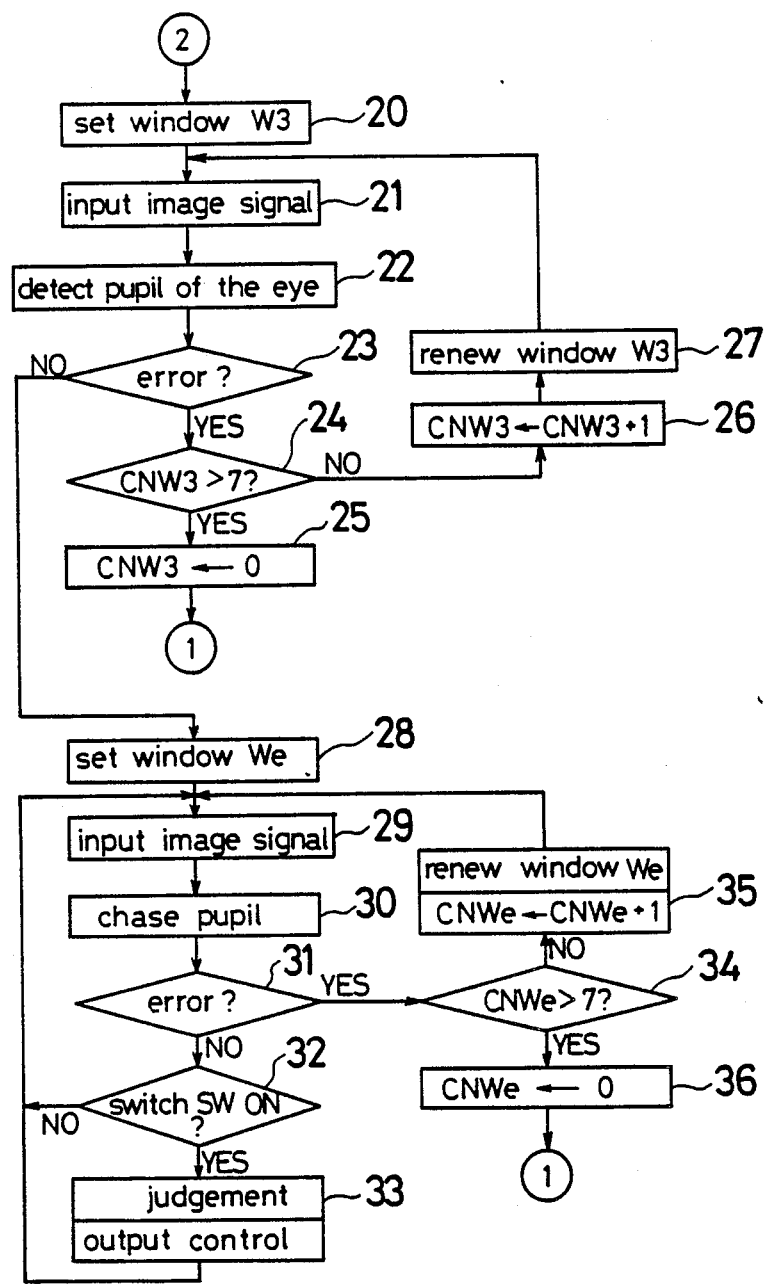

FIGS. 5a and 5b show flow charts of operation of the CPU 100. In this specification the pattern recognition process is not explained, but this embodiment may use a general pattern recognition process as shown in Japanese Patent Application No. 60(1985)-272793.

Referring to FIG. 5a, when the power is on, CPU 100 initializes the settings. The internal RAM memory 120. RAMs 253 and 254 are cleared. Then control sets the window W1 (FIG. 4b) which is used for distinguishing the head of a person. In actual situations, brightness of the background is not constant and the contrast is changed by hair color, a hat, or direction of the light. Therefore, by setting the window W1, the level of the image signal may be adjusted in response to the brightness of the head and the background. In this embodiment, position and area of the window W1, GVE set by the predetermined data. The window W1 is a rectangle which has a long side of 216 dots and a short side of 64, dots, and the left top corner of the rectangle is positioned 5 dots from the top of the image frame and 20 dots from the left side of the image frame.

In this embodiment, because the window W1 is a rectangle, coordinates on the X axis of the left and right sides are shown as X1 and X2 and coordinates on the Y axis of the top and bottom sides are shown as Y1 and Y2. The value of X1 is written into the memory area addressed by Y1 and Y2 in RAM 253 and the maximum value (256) is written into the other addressed area. The value of X2 is written into the memory area addressed by Y1 and Y2 and "0" (Zero) is written into the other addressed area. Therefore, the analog switch ASW maintains an off state while the horizontal scan is scanning between the first line and the Y1 line, and between the Y2+2 line and the last line. The analog switch ASW maintains an on state while the horizontal scan is scanning between the Y1+1 line and the Y2+1 line and between the X1 dot area and the X1+X2 dot area.

When the control sets the window, the image signal is input. The image signal VS1 of the image signal processing circuit 200 is sampled and converted into 4-bit data by A/D converter 150. 4-bit data is written into the frame memory 150. In this embodiment, because the frame memory 150 generates an internal timing signal by using the synchronization signals SYh, SYv and DCK the image signal VS2 does not have any synchronization signal.

When the image input is finished, the control goes to step 4 in order to detect the head. The data stored in the frame memory 150 is 4-bit data; however, CPU 100 operates with binary signals to compare the data with a predetermined threshold level. In steps 4, 6 and 8, the control detects the coordinate axis Ytp of the top of the head, the coordinate axis XLh of the left side of the head and the coordinate axis XRh of the right side of the head.

Figure 7:
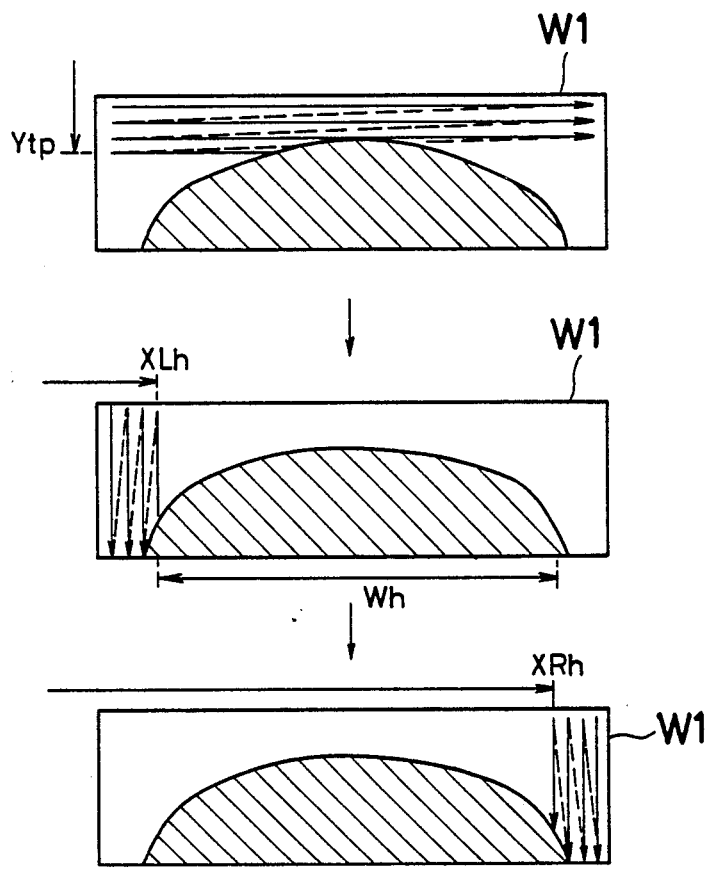
FIG. 7 is a view showing the scan of the window W1 when the head is detected.
Figure 8:
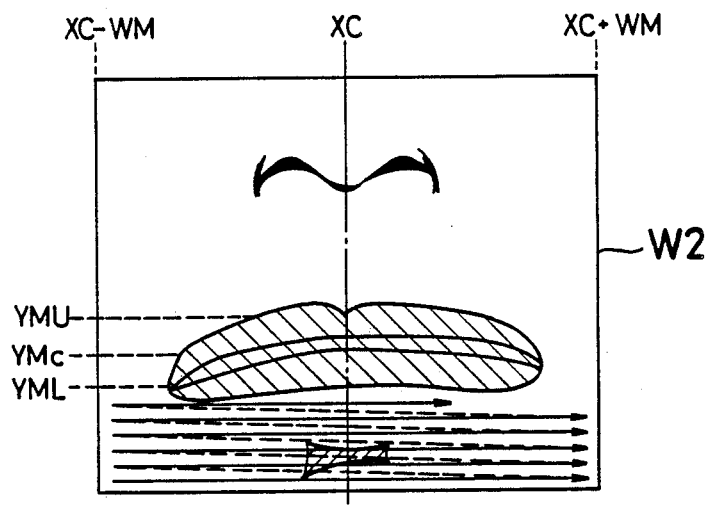
FIG. 8 is a view showing the scan of the window W2 when the mouth is detected.
Figure 9:
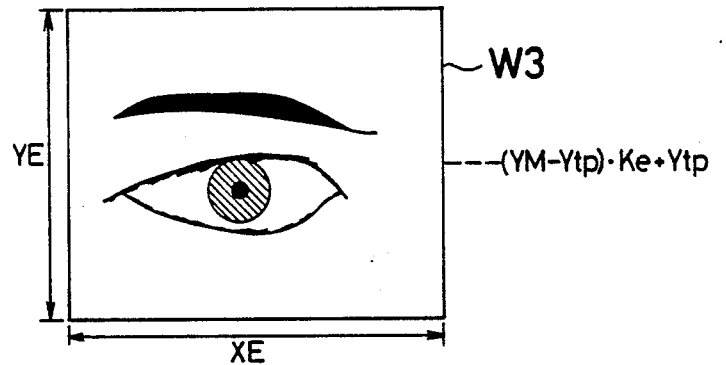
FIG. 9 is a view showing the window W3.

When the control detects the coordinate axis Ytp, the main horizontal scan is scanning horizontally and the sub-scan is scanning from the top to the bottom. The control detects the length of the black level horizontally and if the length is longer than a predetermined length, the line of the coordinate axis Y shows Ytp as shown in FIG. 7. When the control detects coordinate axis XLh, the main vertical scan is scanning vertically and the sub-scan is scanning from the left to the right. The control detects the length of the black level vertically, and if the length is longer than a predetermined length, the line of the coordinate axis X shows XLh as shown in FIG. 7. When the control detects the coordinates axis XRh, the main scan is scanning vertically and the sub-scan is scanning from the right to the left. The control detects the length of the black level vertically, and if the length is longer than a predetermined length the line of the coordinate axis shows XRh. In any of the steps 4, 6, and 8, if there is an error, control passes to step 10 and increments the counter CNW1. In step 11, the window W1 is renewed in response to the counter CNW1. The position and the area of the window are changed in accordance with the counter CNW1.

After detecting the head, control goes to step 12 and changes the window W1 into the window W2. This window W2 covers a mouth. The coordinate axis Y of the bottom of the window W2 is positioned 10 dots from the bottom of the image frame, and the vertical side of the window W2 is 80 dots. The control calculates the center coordinate axis XC of the head by the left side XLh and the right side XRh. Then the left and the right side coordinate axis are set as XC−WM and XC+WM. wherein WM is a predetermined value. Therefore, the horizontal length of the window W2 is adjusted by the head position automatically.

After setting the window W2 the control inputs the image signal into the frame memory 150 in step 13 and detects the position YMc of the mouth in step 14. The main horizontal scan is scanning horizontally and the sub-scan is scanning from the bottom to the top of the image frame. The control counts the length of the black level and if the length is longer than a predetermined length, the control stores the coordinate axis Y at that line. Then the control detects the mouth position where the center axis YMc between the top axis YMU and the bottom axis YML at which are detected whether the length of the black is longer than the predetermined length successively. If an error occurs in step 14, the control goes to step 18 and increments the counter CNW2.

In step 19, the position of the window W2 is adjusted in response to the counter CNW2. If the counter CNW2 shows values 1, 2, 3, 4, 5, 6, 7 and 8, the axis (x y) is (x y+Δ y), (X+ΔX, y+Δy), (X+ΔX, y), (X+ΔX, y−Δy), (X, y−Δy), (X−ΔX, y−Δy), (X−ΔX, y) and (X−ΔX, y+Δy), respectively. However, in step 16, if the counter CNW2 shows over 7, the counter CNW2 is cleared to "0" in step 17 and the control goes back to step 2.

After detecting the mouth position YMc the control goes to step 20 in FIG. 5b and changes from the window W2 to the window W3. The window W3 covers the eye. The center axis Y is determined by the top end position Ytp of the head, the mouth axis position YMc and a predetermined constant Ke. The axis X is determined by the center axis XC and a predetermined constant. The window W3 has a fixed width XE and height YE. After setting the window W3, the control inputs the image signal into the frame memory 150 and then goes to step 22 to detect the pupil. If an error occurs, the counter CNW3 is incremented in step 26. In step 27, the position of the window W3 is adjusted in response to the counter CNW3. If the counter CNW3 shows 1, 2, 3, 4, 5, 6, 7, and 8, the axis (x, y) are (X, y+Δy), (X+ΔX, y+Δy), (X+ΔX, y), (X+ΔX, y−Δy), (X, y−Δy), (X−ΔX, y−Δy), (X−ΔX, y) and (X−ΔX, y+Δy), respectively. However, in step 24 if the counter shows over 7, the control clears the counter CNW3 and goes back to step 2.

After detecting the pupil, the control goes to step 2B and sets the window We. This window We which cover the pupil is smaller than the window W3. After setting the window We, the control inputs the image signal into the frame memory 150 and goes to step 30 in order to change the pupil movement If an error occurs, control goes to step 35 and changes the position of the window We in accordance with the counter CNWe. When the counter CNWe shows over 7, the counter is cleared in step 36 and control goes to step 2.

If the control detects pupil movement, the control checks the state of switch. If the switch is on, the control goes to step 33 in order to determine whether the movement of the pupil corresponds with a predetermined movement. If it corresponds with the predetermined movement, the control outputs the signal to the controller in accordance with the eye movement.

Various changes in the foregoing within the spirit of the invention will be apparent to those of working skill in this technology. Consequently, the invention should be considered as limited only by the scope of the appended claims.

What is claimed is:

1. An image signal amplifier comprising:
   data storing means for storing a sampling area signal indicative of a sampled area of an entire image;
   area recognition means for identifying a scanning signal detected by a synchronized scan of an input image signal with said stored sampling area signal, and for determining whether said scanning signal is greater than said stored sampling area signal so as to recognize said sampled area, said area recognition means providing an output based on said sampled area;
   gain control means for controlling an amplifier gain of an input analog signal; and
   switching means for switching on and off said input analog signal which is applied to said gain control means in accordance with said output of said area recognition means, such that said gain control means controls said amplifier gain based on said sampled area of said entire image.

2. An image signal amplifier as recited in claim 1, wherein said data storing means includes pattern recognition means for recognizing a predetermined pattern using part of the image information which is included in said image signal, and for controlling said sampled area in accordance with said recognized pattern.

3. An image signal amplifier as recited in claim 2, wherein said pattern recognition means changes at least one of a sampling area position or sampling area size when an error is detected.

4. An image signal amplifier as recited in claim 2, wherein said pattern recognition means includes means for recognizing human facial features, including one of eye movement and mouth movement.

5. An image signal amplifier as recited in claim 4, further comprising controlling means for controlling selected functions in an automobile and microprocessor means, responsive to an output of said data storing means, for operating said controlling means.

6. An image signal amplifier as recited in claim 5, wherein said controlling means include at least one of means for controlling a radio, means for controlling an air conditioner means for controlling an automobile cruise control, means for controlling automobile door locks, means for controlling a sun roof, means for controlling raising and lowering of windows, means for controlling windshield wipers, means for controlling a cigarette lighter, means for controlling headlights, means for controlling a defroster, and means for controlling an automobile door buzzer.

* * * * *